(12) United States Patent
Schwartz et al.

(10) Patent No.: US 10,656,704 B2
(45) Date of Patent: May 19, 2020

(54) VIRTUAL REALITY MOBILE POD

(71) Applicant: Universal City Studios LLC, Universal City, CA (US)

(72) Inventors: Justin Michael Schwartz, Orlando, FL (US); Ross Alan Osterman, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 77 days.

(21) Appl. No.: 15/591,975

(22) Filed: May 10, 2017

(65) Prior Publication Data

US 2018/0329480 A1 Nov. 15, 2018

(51) Int. Cl.
| | |
|---|---|
| *A63F 13/90* | (2014.01) |
| *G06F 3/01* | (2006.01) |
| *A63F 13/27* | (2014.01) |
| *A63G 33/00* | (2006.01) |

(52) U.S. Cl.
CPC .............. *G06F 3/011* (2013.01); *A63F 13/27* (2014.09); *A63F 13/90* (2014.09); *A63G 33/00* (2013.01); *A63F 2300/8082* (2013.01)

(58) Field of Classification Search
CPC .. G06F 3/001; A63F 2300/8082; A63F 13/27; A63G 25/00; A63G 33/00
See application file for complete search history.

(56) References Cited

U.S. PATENT DOCUMENTS

| | | | | |
|---|---|---|---|---|
| 5,152,730 | A * | 10/1992 | Hoffman | A61H 3/008 135/67 |
| 5,961,541 | A * | 10/1999 | Ferrati | A61F 5/0102 434/307 R |
| 7,289,130 | B1 * | 10/2007 | Satoh | A63F 13/10 345/629 |
| 2004/0201210 | A1 * | 10/2004 | Gochioco | A63G 25/00 280/771 |
| 2005/0183759 | A1 * | 8/2005 | Wolfe | A61H 3/04 135/67 |
| 2007/0060229 | A1 * | 3/2007 | Okada | A63F 13/08 463/1 |

(Continued)

FOREIGN PATENT DOCUMENTS

KR  20150135154  12/2015

OTHER PUBLICATIONS

PCT/US2018/031344 Invitation to Pay Additional Fees dated Aug. 27, 2018.

*Primary Examiner* — Jasson H Yoo
(74) *Attorney, Agent, or Firm* — Fletcher Yoder P.C.

(57) ABSTRACT

In accordance with one embodiment, a system includes a virtual reality attraction system. The virtual reality attraction system includes virtual reality (VR) and/or augmented reality (AR) headgear configured to display AR images and/or VR images to a user, and at least one user-assisted vehicle configured to accommodate the user. The vehicle includes a frame configured to permit the user to provide at least partial motor power to move the vehicle within the attraction. The frame defines a boundary about the user. The vehicle also includes a harness coupled to the frame and configured to provide support to the user when the user is in the vehicle, and a vehicle controller configured to communicate the AR and/or VR images to the virtual reality (VR) and/or augmented reality (AR) headgear.

25 Claims, 4 Drawing Sheets

(56) References Cited

U.S. PATENT DOCUMENTS

2016/0048203 A1 2/2016 Blum et al.
2016/0196694 A1 7/2016 Lindeman
2016/0349509 A1 12/2016 Lanier et al.
2018/0033199 A9 2/2018 Eatedali et al.

* cited by examiner

VIRTUAL REALITY MOBILE POD

FIELD OF DISCLOSURE

The present disclosure relates generally to the field of amusement parks. More specifically, embodiments of the present disclosure relate to methods and equipment used in conjunction with amusement park games or rides.

BACKGROUND

Since the early twentieth century, amusement parks (or theme parks) have substantially grown in popularity. One type of amusement park attraction may consist of a dark ride, in which multiple patrons are secured into individual cars as they travel within a predetermined path within a ride environment that includes preset effects that enhance a ride narrative. For example, projected images, smoke effects, and/or motion effects may be used to create a sense of immersion in the ride. In parallel, the use of virtual reality (VR) and augmented reality (AR) entertainment systems, e.g., for consumer entertainment, has been on the rise. Certain types of attractions may incorporate VR/AR headsets that are worn by patrons to facilitate a sense of immersion in an alternate universe in a manner that enhances the ride narrative.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a virtual reality attraction system. The virtual reality attraction system includes virtual reality (VR) and/or augmented reality (AR) headgear configured to display AR images and/or VR images to a user, and at least one user-assisted vehicle configured to accommodate the user. The at least one user-assisted vehicle includes a frame configured to permit the user to provide at least partial motor power to move the at least one user-assisted vehicle within the attraction. The frame defines a boundary about the user. The at least one user-assisted vehicle also includes a harness coupled to the frame and configured to provide support to the user when the user is in the at least one user-assisted vehicle, and a vehicle controller disposed on the at least one user-assisted vehicle and configured to communicate the AR and/or VR images to the virtual reality (VR) and/or augmented reality (AR) headgear.

In another embodiment, a virtual reality attraction system includes multiple user-assisted vehicles in an attraction. Each respective user-assisted vehicle includes a vehicle controller, and an attraction controller configured to provide AR and/or VR images for an attraction and to communicate the AR and/or VR images to the multiple user-assisted vehicles. The attraction controller includes a processor storing instructions that, when executed, operate to: receive a first set of position information from each of the multiple user-assisted vehicles over time, determine that a first user-assisted vehicle is within a predetermined distance of a second user-assisted vehicle, and output an updated AR and/or VR image to the vehicle controller of one or both of the first and second user-assisted vehicles based on the determination that the first user-assisted vehicle is within the predetermined distance of the second user-assisted vehicle.

In another embodiment, a virtual reality attraction system includes an attraction environment having multiple attraction structures and at least one user-assisted vehicle configured to accommodate a user. The at least one user-assisted vehicle includes a frame, which is configured to permit the user to at least partially provide motor power to move the at least one user-assisted vehicle within the attraction. The frame defines a boundary about the user, and a harness is coupled to the frame and configured to provide support to the user when the user is in the at least one user-assisted vehicle. The frame also includes a vehicle controller disposed on the at least one user-assisted vehicle and configured to communicate augmented reality (AR) and/or virtual reality (VR) images to VR and/or AR headgear worn by the user. The frame further includes an attraction controller having a processor configured to execute instructions to cause the attraction controller to: communicate with the vehicle controller to provide the AR and/or VR images to the at least one user-assisted vehicle controller; receive position information representative of a position of the at least one user-assisted vehicle within the environment; and update the AR and/or VR images based on the position information.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
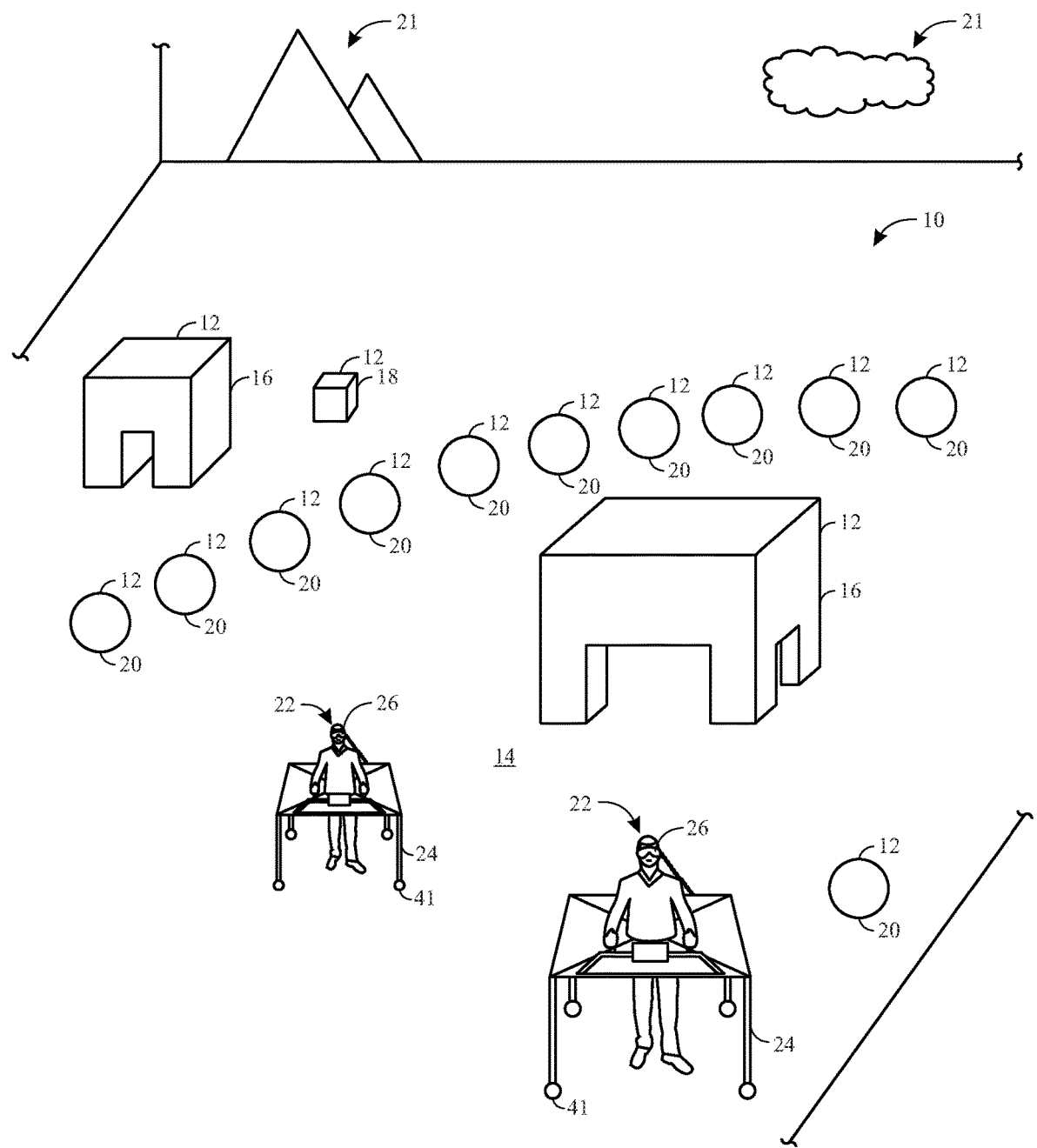
FIG. 1 is an illustration of an embodiment of a game environment that may utilize an augmented reality (AR) or virtual reality (VR) mobile pod in accordance with present techniques.

While virtual reality (VR) and/or augmented reality (AR) systems aim to provide immersive entertainment, certain challenges exist that prevent users from being completely immersed in their experiences. A typical VR user wears a headset that replaces images of the actual environment with the virtual environment. Because the user cannot see the actual environment, the user cannot determine where boundaries, obstacles, or other users are within the environment to avoid inadvertent contact. To prevent such inadvertent contact, an attraction may restrict the movement of the user by providing a controlled ride path for a vehicle in which the user is restrained. However, by not permitting the user to move freely within the virtual environment, users are prevented from having a truly immersive experience. Another type of entertainment system may use a treadmill or sliding-type walking surface to provide the illusion of free movement while holding the user in one place. However, such systems do not feel like a natural walking movement to certain users. Other types of entertainment systems provide warnings to users when boundaries are reached beyond which the VR experience is unsupported. However, the warnings serve to pull the user out of the experience.

Provided herein are mobile pods for use within a VR or AR game or attraction. It should be understood that, while certain embodiments are disclosed in the context of VR, the disclosed embodiments may alternatively or additionally be used in conjunction with VR and/or AR games or attractions. Further, while certain embodiments may be disclosed in the context of amusement or theme parks, the mobile pods may be used in other contexts, e.g., for entertainment venues, home entertainment use, etc.

Presently disclosed embodiments provide an AR and/or a VR attraction system in which one or more users navigate an environment of the VR attraction. The mobile pod may provide a natural boundary around the user to limit inadvertent contact within the attraction. For example, each user may experience the environment while positioned within a respective mobile pod. In this manner, while the structure of the mobile pod itself may contact an obstacle, direct contact with the obstacle for the user positioned within the mobile pod is limited. Accordingly, while the user may experience a slight bump or slowdown, the user may not directly feel contact with, for example, a boundary wall or other user. Further, the bump or slowdown may be augmented with VR images so that the user experiences the bump or slowdown as a natural event within the narrative of the attraction.

In one embodiment, a mobile pod may be equipped with or used in conjunction with VR headgear and may allow the user to walk on a surface of the environment to at least partially power the movement of the mobile pod. The mobile pod may also provide a support (e.g., harness) for the user within the mobile pod. For example, although the user may walk on an irregular surface of the environment, the support may prevent the user from tripping and/or falling. Further, to help the user more fully experience an intended game or other virtual environment, the mobile pod may be equipped with a special effects system. The special effects system may provide effects that include a fluid system, a sound system, a vibration system, an air system, etc.

The virtual environment may provide a variety of different interactive objects. For example, the virtual environment may have one or more structures that a user may perceive as a game character through the VR headgear. The virtual environment may also utilize one or more gaming pieces that may be manipulated by the user. In some embodiments, if a user moves within a distance threshold of another object (e.g., a second user, a virtual construct), certain effects may be triggered. For example, if a mobile pod is moved (e.g., steered) within the distance threshold of a structure, the structure may perform an action, which may be interpreted by a processor in a number of ways. The interpretation may be displayed to a user through the VR headgear. Further, the virtual environment may be reconfigurable to be applicable for a variety of themes.

Aspects of the virtual attraction may be processed by one or more controllers. For example, an attraction controller may communicate with a pod controller on each of the VR mobile pods. The one or more controllers may process information related to images displayed to the user via the VR headgear, special effects of the environment/mobile pod, and overall control of the environment/mobile pod.

The disclosed VR attraction system may be implemented with amusement park attractions including shows, rides, games, promotions, and so forth. By employing the VR attraction system in conjunction with particular themes, such as traditional video games, guests are incentivized to visit the amusement park and are further enabled to enjoy the thematic experience provided by the amusement park. Further, because the VR attraction system is flexible, one game arena may be configured to host games having a variety of different themes.

With the foregoing in mind, FIG. 1 illustrates an embodiment of an attraction 10 (e.g., a virtual reality/alternate reality (VR/AR) thrill game) in accordance with the present disclosure. The attraction 10 may include a variety of interactive objects 12 placed about an environment 14 of the attraction 10. For example, one or more structures 16, items 18, and refill stations 20 may be placed about the environment 14. The attraction 10 may also include a variety of background images 21 in accordance with a theme of the attraction 10. In the current embodiment, the interactive objects 12 are simple constructions having flat, uniform surfaces. In some embodiments, the interactive objects may comply with a theme of the environment. For example, if the theme of the environment is a dinosaur theme, the structures 16 may be dinosaur models, the items 18 may be dinosaur eggs, and the refill stations 20 may be bodies of water. Indeed, the interactive objects may be endlessly customizable in location, size, shape, etc. In some embodiments, the interactive objects 12 may be mechanically driven to move according to a theme. For example, in the embodiment of a dinosaur theme, a structure 16 (e.g., dinosaur model) may be mechanically driven to shake its head or tail. In some embodiments, the interactive objects 12 may be coupled (e.g., bolted) to a surface of the environment 14. Additionally, or in the alternative, the interactive objects 12 may be manipulated (e.g., picked up, utilized, etc.) by users of the attraction 10.

Users 22 of the attraction 10 may navigate the environment 14 while positioned within pods 24 (e.g., user-assisted vehicles, mobile pods). As will be discussed thoroughly below, the users 22 may walk around the environment 14 within the confines (e.g., boundary) of the pods 24. The users 22 may navigate the environment 14 with the purpose of completing a goal, or game objective. The goal, or game objective, may be communicated to the user through images displayed through VR/AR headgear 26 and/or, in certain embodiments, via a display screen associated with each pod 24. The users 22 may see VR/AR images in accordance with the theme of the environment through the VR/AR headgear 26. An embodiment of a VR/AR scenario as seen by the users 22 through the VR/AR headgear 26 may be seen in FIG. 2.

Figure 2:
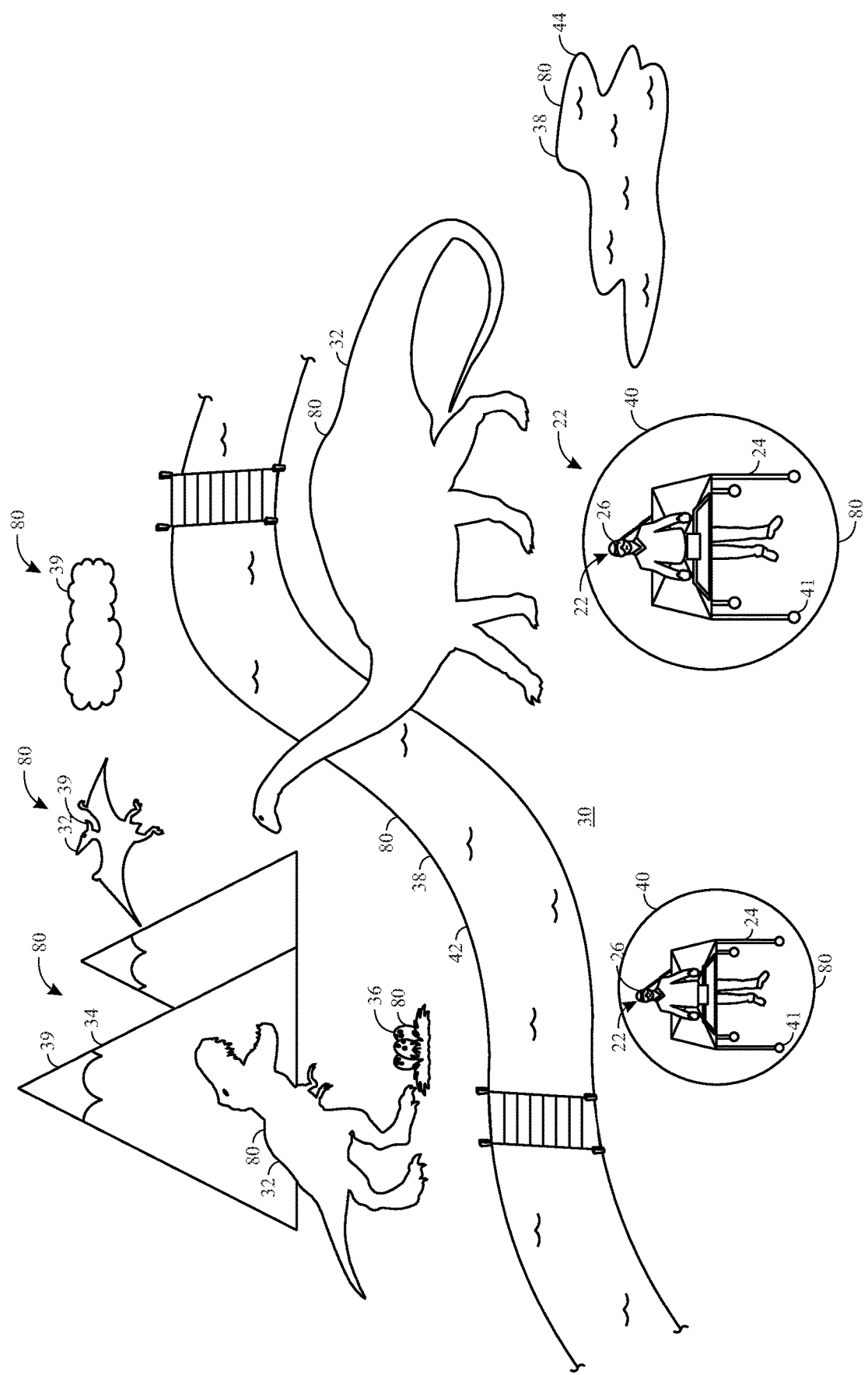
FIG. 2 is an illustration of an embodiment of a VR scenario that may be used in conjunction with the game environment of FIG. 1 in accordance with present techniques.

FIG. 2 is an illustration of an embodiment of a VR/AR scenario 30 of the environment 14 of FIG. 1. As discussed thoroughly below, images of the VR/AR scenario 30 may be communicated to the user through the VR/AR headgear 26. The VR/AR scenario 30 may include many VR and/or AR visuals, as well as real-world images (e.g., images of the environment 14). For example, the VR/AR scenario 30 may include VR/AR components 80 such as VR/AR creatures 32, VR/AR background features 34, VR/AR objects 36, VR/AR nature effects 38, VR/AR pods 40, distant VR/AR objects 39, etc. The VR/AR components 80 may appear in place of physical objects, e.g., interactive objects 12, of the environment 14. For example, instead of a physical real-world structure 16, the users 22 may see the VR/AR creatures 32. Similarly, instead of refill stations 20 or items 18, users 22 may see VR/AR nature effects 38 and VR/AR objects 36, respectively. In some embodiments, within the VR environment, the pods 24 may appear as VR/AR pods 40. The VR/AR pods 40 may be portrayed to the users 22 in a way that is consistent with the theme of the environment discussed above. In certain embodiments, users 22 may appear to other users 22 as a creature in accordance with the theme of the environment. For example, the VR/AR pod 40 images may be triggered if the users 22 are within a threshold distance of one another. In other examples, a physical real-world pod 24 may be viewed as a robotic structure, a vehicle, etc.

There may be certain advantages to having visuals of the VR/AR scenario 30 correspond to real world items as discussed above. One such advantage of the VR/AR creatures 32 corresponding to real-world objects is that a user may interact with the VR/AR creature 32 to some degree. For example, if the user 22, while positioned with the VR/AR pod 40, bumps into/approaches the VR/AR creatures 32, the user 22 may experience a reaction force from the collision because the pod 24 is actually contacting a physical object (e.g. structure 16). Depending on the context of the attraction narrative, such a collision may enhance the immersion effect. For example, in a bumper car narrative, a real-world bump may reflect a game goal. Further, real-world physical encounters may be augmented not only via VR/AR images as viewed by the user, but also by effects mediated through each pod 24, as provided herein.

In some embodiments, the user 22 may not come in contact with the physical object and still experience a reaction in accordance with the attraction narrative. For example, as will be discussed later in detail, the pod 24 may utilize a braking system and/or a locking/manipulation of wheels 41 of the pod 24. In this manner, if the user 22 is in a threshold distance of another physical object (e.g., structure 16, a different user 22, etc.), brakes of the braking system may engage (e.g., via locking of the wheels 41) and/or the wheels 41 may redirect the user 22 to avoid a collision with the physical object. Depending on the attraction narrative, engaging the brakes and/or manipulating the wheels 41 may enhance the immersion effect.

Interaction with the VR/AR creatures 32 (e.g., structures 16) may cause an event (e.g., a special effect) to take place such as the VR/AR creature 32 roaring, stomping the ground, or turning to look at the user 22. Similarly, if a user crosses a river 42 or a puddle 44 of the VR nature effects 38, the user 22 may literally walk across a refill station 20 and get wet from doing so. A further advantage of visuals of the VR/AR scenario 30 corresponding to real-world items is that the users may manipulate VR/AR objects 36. For example, a user may pick up a VR/AR object 36 (e.g., the item 18) via control of the pods 24. In accordance with the dinosaur theme discussed above, the user 22 may see that they are picking up an egg, a baby dinosaur, etc. In some embodiments, if the users 22 bump into the VR/AR objects 36, the users may see that they are knocking over the egg, baby dinosaur, etc.

In certain embodiments, not every visual of the VR/AR scenario 30 may correspond to the interactive objects 12 of the environment 14. For example, the user 22 may see VR/AR images of the background features 34 or other distant VR/AR objects 39. In some embodiments, because the distant VR/AR objects 39 may appear in a sky and out of reach, there may not be a benefit to having the distant VR/AR objects 39 corresponding to real-world objects of the environment 14. In some embodiments, the background features 34 may correspond to a boundary (e.g., wall) of the environment 14. As discussed in detail below, because the users 22 may, in certain embodiments, interact with the environment (e.g., through bumping), the pod 24 may provide a support and frame. It should be noted, as discussed below, that the pods 24 may provide methods of further interaction between the users 22 and the environment 14 and/or VR/AR scenario 30 in ways other than bumping into and walking over elements of the environment 14.

Figure 3:
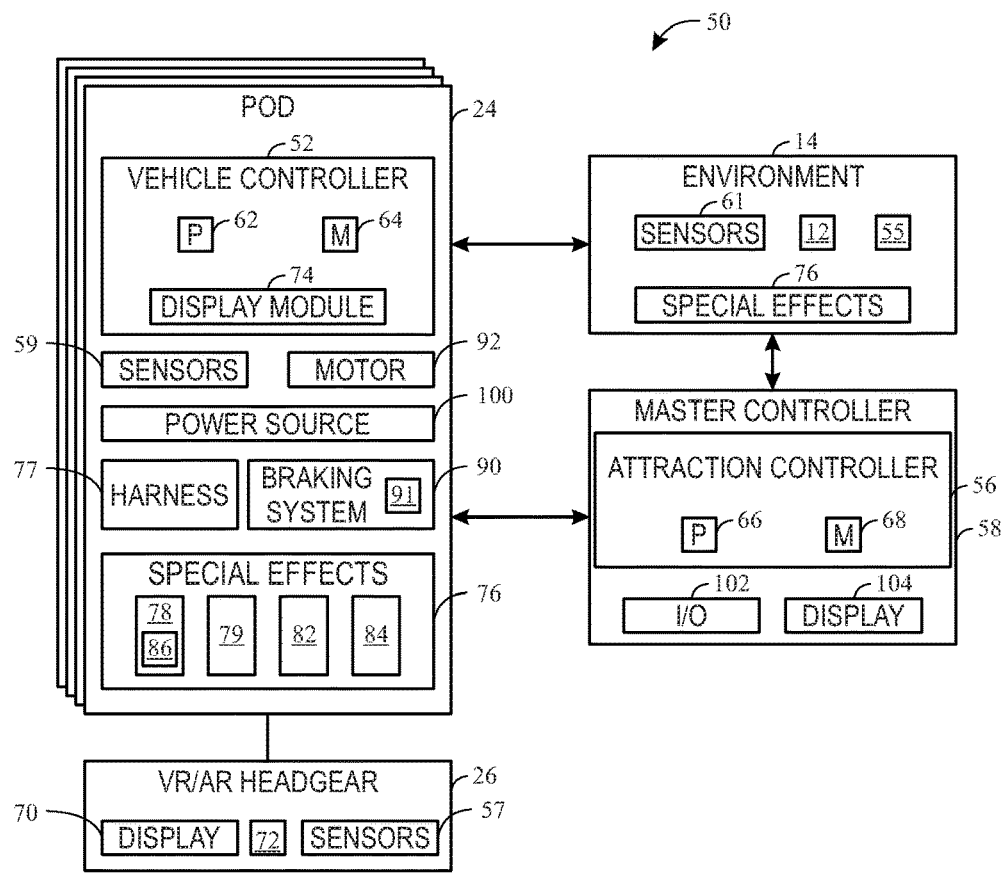
FIG. 3 is a block diagram of a virtual reality attraction system that may be used in conjunction with the game environment of FIG. 1 in accordance with present techniques.

Keeping this in mind, FIG. 3 is a block diagram of a virtual reality attraction system 50 of the attraction 10 of FIG. 1. Each of the users 22 may be provided with a pod 24 (e.g., user-assisted vehicle) that may be separate from or coupled to the VR/AR headgear 26. In some embodiments, the VR/AR headgear 26 may be included as part of a helmet, a visor, a headband, a pair of blinders, one or more eyepatches, and/or other headwear or eyewear that may be worn by the users 22. As depicted, the VR/AR headgear 26 may be communicatively coupled to a vehicle controller 52 of the pod 24, which is communicatively coupled to an attraction controller 56 of a master controller 58 and the environment 14 via a wireless network (e.g., wireless local area networks [WLAN], wireless wide area networks [WWAN], near field communication [NFC]). The vehicle controller 52, headgear 26, and attraction controller 56 may be used to create the VR/AR scenario 30, which may include an AR experience, a VR experience, a mixed reality (e.g., a combination of AR and VR) experience, a computer-mediated reality experience, a combination thereof, or other similar surreal environment for the users 22 as the users 22 enjoy the attraction 10. Specifically, the VR/AR headgear 26 may be worn by the users 22 throughout the duration of the game, such that users 22 may feel completely encompassed by the VR/AR scenario 30 and may perceive the VR/AR scenario 30 to be a real-world physical environment. Specifically, as will be further appreciated, the VR/AR scenario 30 may be a real-time video including real-world images of the environment 14 that the users 22 would see, even when not wearing the VR/AR headgear 26 electronically merged with one or more AR or VR images (e.g., virtual augmentations). The term "real-time" indicates that the images are obtained and/or provided in a timeframe substantially close to the time of actual observation.

In certain embodiments, the VR/AR headgear 26 may be any of various wearable electronic devices that may be useful in creating an AR experience, a VR experience, and/or other computer-mediated experience to enhance the thrill factor of the attraction 10, and, by extension, the experience of the users 22 while in the attraction 10. It should be appreciated that VR/AR headgear 26 as discussed herein may be distinct from, and may provide many advantages over traditional devices such as traditional head-mounted displays (HMDs) and/or heads-up displays (HUDs). For example, as will be further appreciated, the VR/AR headgear 26 may include a number of orientation and position sensors 57, e.g., accelerometers, magnetometers, gyroscopes, Global Positioning System (GPS) receivers, that may be used to track the position, orientation, and motion of the users 22 during a cycle of the attraction 10.

In some embodiments, the VR/AR headgear 26 (e.g., indicators disposed thereon) may be monitored by a monitoring system (e.g., one or more cameras 55) to determine position, location, orientation, and so forth of the VR/AR headgear 26 and that of the user 22. The monitoring system may be communicatively coupled to the virtual reality attraction system 50 and used to identify position, location, orientation, and so forth of the users 22. Alternatively or additionally, the pod 24 may also include one or more sensors 59 (e.g., weight sensors, mass sensors, motion sensors, ultrasonic sensors, position sensors) that may be useful in monitoring the respective users 22 for the virtual reality attraction system 50 to determine the point of view and/or location of the respective users 22. Similarly, the environment 14 may also include one or more sensors 61 (e.g., weight sensors, mass sensors, motion sensors, ultrasonic sensors, cameras) that may be useful in monitoring the respective users 22 for the virtual reality attraction system 50 to determine the point of view and/or location of the respective users 22.

In certain embodiments, to support the creation of the VR/AR scenario 30, the vehicle controller 52 of the pod 24 may include processing circuitry, such as a processor 62 and a memory 64. Similarly, the attraction controller 56 of the master controller 58 may include processing circuitry, such as a processor 66 and a memory 68. The processors 62, 66 may be operatively coupled to the memories 64, 68, respectively, to execute instructions for carrying out the presently disclosed techniques of generating the VR/AR scenario 30 to enhance the thrill factor of the attraction 10, and, by extension, the experience of the users 22 while in the attraction 10. These instructions may be encoded in programs or code stored in a tangible non-transitory computer-readable medium, such as the memories 64, 68 and/or other storage. The processors 62, 66 may be general-purpose processors, system-on-chip (SoC) devices, application-specific integrated circuits (ASICs), or some other similar processor configuration.

In certain embodiments, as further illustrated, the VR/AR headgear 26 may also include a pair of displays 70 respectively corresponding to each eye of the users 22. In other embodiments, a unified display 70 may be employed. The display 70 may include an opaque liquid crystal display (LCD), an opaque organic light emitting diode (OLED) display, or other similar display useful in displaying real-time images of the environment 14 and the VR/AR scenario 30 to the users 22. In another embodiment, the display 70 includes a see-through LCD or a see-through OLED display useful in allowing, for example, the users 22 to view the real-time images of the environment 14 and the VR/AR scenario 30 appearing on the display 70 while preserving the ability to see through display 70 to the actual and physical real world environment (e.g., the environment 14).

Camera(s) 72 may respectively correspond to the respective points of view of the users 22, and may be used to capture real-time video data (e.g., live video) of the environment 14. Specifically, in the illustrated embodiment, the camera(s) 70 of the VR/AR headgear 26 may be used to capture real-time images of the real-world physical environment 14 perceived by the respective users 22 from the point of view of the respective users 22. As will be further appreciated, the VR/AR headgear 26 may then transmit (e.g. wirelessly via one or more communications interfaces included in the VR/AR headgear 26) real-time video data captured via the camera(s) 70 to the vehicle controller 52 and/or the attraction controller 56 for processing (e.g., via a graphics processing unit (GPU) of the controllers 52 and 56). Additionally, the VR/AR headgear 26 may also transmit orientation data, position data, point of view data (e.g., focal length, orientation, pose, and so forth), motion tracking data, and so forth obtained and/or derived based on data obtained via orientation and position sensors 57, 59, 61, 55 (e.g., accelerometers, magnetometers, gyroscopes, Global Positioning System [GPS] receivers, motion-capture cameras and so forth) motion tracking sensors (e.g., electromagnetic and solid-state motion tracking sensors), and so forth, that may be included in the VR/AR headgear 26, the pod 24, and the environment 14.

In certain embodiments, as previously noted, the vehicle and/or attraction controllers 52, 56 may process the real-time video data (e.g., live video) and orientation and position data and/or point of view data received from the pod 24. Specifically, the vehicle and/or attraction controllers 52, 56 may use this data to generate a frame of reference to register the real-time video data with the generated VR/AR scenario 30. Specifically, using the frame of reference generated based on the orientation data, position data, point of view data, motion tracking data, and so forth, the vehicle and/or attraction controllers 52, 56 may then render a view of the VR/AR scenario 30 that is temporally and spatially commensurate with what the respective users 22 would perceive if not wearing the VR/AR headgear 26. The vehicle and/or attraction controllers 52, 56 may constantly update (e.g., in real-time) the rendering of the real-world images to reflect change in respective orientation, position, and/or motion of the respective users 22.

For example, in certain embodiments, the vehicle and/or attraction controllers 52, 56 may render images (e.g., VR/AR scenario 30) at a real-time rate greater than or equal to approximately 20 frames per second (FPS), greater than or equal to approximately 30 FPS, greater than or equal to approximately 40 FPS, greater than or equal to approximately 50 FPS, greater than or equal to approximately 60 FPS, greater than or equal to approximately 90 FPS, or greater than or equal to approximately 120 FPS. Furthermore, the vehicle and/or attraction controllers 52, 56 may generate the real-world images of the environment 14 for each of the respective VR/AR headgear 26 worn by the respective users 22 (e.g., adjusted for the respective orientation, position, and point of view of the respective users 22).

In certain embodiments, as previously discussed, the vehicle and/or attraction controllers 52, 56 may also generate and render one or more VR/AR graphical images of the VR/AR scenario 30 superimposed on the real-world images of the environment 14 to create a complete AR experience, VR experience, mixed reality, and/or other computer-mediated experience for the users 22. For example, in certain embodiments, the vehicle and/or attraction controllers 52, 56 may utilize one or more of the discussed video merging and/or optical merging techniques to superimpose the VR/AR graphical images of the VR/AR scenario 30 onto the real-world images of the environment 14, such that the users 22 perceive the real-world physical environment 14 of the attraction 10 (e.g., provided as rendered video data via the display 70) along with an VR/AR graphical image of the VR/AR scenario 30 (e.g., virtual augmentations) as the pods 24 traverse the attraction 10. Specifically, as discussed above with respect to the rendering of the real-world images, the vehicle and/or attraction controllers 52, 56 may render a view of the VR/AR graphical images of the VR/AR scenario 30 that is temporally and spatially commensurate with the real-world images of the environment 14, such that the real-world images of the environment 14 may appear as a background overlaid with the VR/AR graphical images of the VR/AR scenario 30. Indeed, a model may provide computer generated images for any available viewpoint and specific images may be provided to the VR/AR headgear 26 for display based on a detected orientation of the VR/AR headgear 26.

In certain embodiments, the vehicle and/or attraction controllers 52, 56 may also generate one or more brightness, lighting, or shading models, and/or other photorealistic rendering models to generate the real-world images of the environment 14 and the VR/AR graphical images of the VR/AR scenario 30 adjusted to accurately reflect contrast and brightness of the real-world physical environment 14 (e.g., sunny day, partly cloudy day, cloudy day, evening, night) in rendering the real-world images of the environment 14 and the VR/AR graphical images of the VR/AR scenario 30. For example, to increase the photorealism of the real-world images of the environment and the VR/AR graphical images of the VR/AR scenario 30, the vehicle and/or attraction controllers 52, 56 may, in some embodiments, receive weather related data from one or more weather forecast and/or prediction systems (e.g., Global Forecast System, Doppler radars, and so forth). The vehicle and/or attraction controllers 52, 56 may then use the weather related data or other similar data to adjust the contrast, brightness, and/or other lighting effects of the real-world images of the environment and/or the VR/AR graphical images of the VR/AR scenario 30.

In other embodiments, the vehicle and/or attraction controllers 52, 56 may adjust the contrast, brightness, and/or other lighting effects of the real-world images of the environment 14 and/or the VR/AR graphical images of the VR/AR scenario 30 based on lighting detected from one or more light sensors included in the VR/AR headgear 26 and/or pod 24 or based on the real-time video data captured by cameras 72. Furthermore, as previously noted, the vehicle and/or attraction controllers 52, 56 may constantly update (e.g., in real-time) the rendering of the VR/AR graphical images of the VR/AR scenario 30 to reflect change in respective orientations, positions, points of view, and/or motion of the respective users 22. For example, the vehicle and/or attraction controllers 52, 56 may render the VR/AR graphical images of the VR/AR scenario on the display(s) 70 of each of the respective headgears 26 worn by the respective the users 22 adjusted for the variable respective positions, points of view, and motions of the respective the users 22.

As will be further appreciated, the vehicle and/or attraction controllers 52, 56 may also generate the VR/AR graphical images of the VR/AR scenario 30 at a time in which the users 22 cross a predetermined point within the environment 14. Thus, in certain embodiments, the vehicle and/or attraction controllers 52, 56 may use the received position data, point of view data, motion data along with GPS data or geographical informational systems (GIS) data to derive an illumination map of, for example, the attraction 10. The vehicle and/or attraction controllers 52, 56 may then use the map to introduce certain VR/AR graphical images of the VR/AR scenario 30 at certain predetermined points (e.g., points based on location, distance, or time) as the users 22 traverse the environment 14. Furthermore, in certain embodiments, the video or image data captured via the camera(s) 72 may be used by the vehicle and/or attraction controllers 52, 56 to determine the points of location of the users 22 and when to introduce certain VR/AR graphical images of the VR/AR scenario 30. For example, the GPU of the controllers 52 and 56 may perform one or more geometric recognition algorithms (e.g., shape or object recognition) or photometric recognition algorithms (e.g., face recognition or specific object recognition) to determine the position or location of the users 22 as well as the viewing position of the users 22. In some embodiments, the vehicle controller 52 may be located within a carrying device (e.g., backpack) that may be worn by the user 22. In some embodiments, the vehicle controller 52 and/or attraction controller 56 may communicate wirelessly with the VR/AR headgear 26. Further, in some embodiments, the vehicle controller 52 may be integrally coupled with the VR/AR headgear 26. In addition, it should also be noted that, while embodiments discussed above may utilize a separate a vehicle controller 52 and/or an attraction controller 56, some embodiments may utilize a single controller configured to perform the actions of the vehicle controller 52 and attraction controller 56 as described herein. In some embodiments, the single controller may be disposed on the pod 24 or somewhere else within the attraction 10.

In addition to the elements discussed above, the pod 24 may include a display module 74, a special effects system 76 (e.g. special effects delivery system), a harness 77 (e.g., a user support), and a braking system 90. The display module 74 may be located in front of the user on a frame 81 of the pod 24. They display module 74 may communicate a variety of information to the user. For example, in some embodiments, display module 74 may communicate a map illustrating an overview (e.g., satellite view) of the VR/AR scenario 30. The map may display one or more icons representing the location of various components 80 (e.g., other users 22, VR/AR nature effects 38, VR/AR creatures 32, VR/AR objects 36, etc.) of the VR/AR scenario 30 as seen in FIG. 2. The display module 74 may also communicate various messages to the users 22. For example, the display module may display an objective of the attraction 10, a message indicating that the user is approaching a specific location (e.g., a game boundary, a component 80, etc.), a message indicating a status of an objective of the attraction 10 (e.g., points, time remaining, possession of game objects, etc.). In some embodiments, the display module 74 may function as an input/output device for the user. Therefore, the display module 74 may include one or more input devices (e.g., one or more touchscreens, knobs, dials, buttons, switches, etc.) that the user may utilize to perform various functions (e.g., interactions, movements, etc.) within the attraction 10. In some embodiments, however, the display module 74 may only be utilized if the user 22 is not wearing the VR/AR headgear 26. In such embodiments, the display module 74 may communicate to the user 22 instructions for donning and/or storing the VR/AR headgear 26.

The special effects system 76 may include a fluid effects system 78, a vibration effects system 79, a sound effects system 82, an air effects system 84, or any combination thereof. A similar special effects system 76 may also be included within various aspects (e.g., components 80) of the environment 14. The fluid effects system 78 may include a bladder 86 (e.g., a reservoir) that may contain fluid (e.g., special effects material, water, scent fluids, etc.). In some embodiments, the special effects system 76 may be utilized through one or more components 80 of the environment 14. The bladder 86 may be sealed and disposed within the frame 81 of the pod 24. Therefore, the bladder 86 may not be accessible to the user 22. Indeed, in some embodiments, separate tools may be required to access the bladder 86. In some embodiments, the bladder 86 may be disposed on an exterior of the frame 81. The fluid effects system 78 may draw a fluid (e.g., water) from the bladder 86 to utilize in providing a special effect to the user. For example, in some embodiments, the fluid effects system 78 may emit a mist. The mist may be triggered when the users 22 navigate close to a component 80 (e.g., VR/AR nature effects 38, VR/AR creatures 32). The utilization of the fluid effects system 78 may provide for a unique experience to the user. For example, the user 22 may feel as if they are literally feeling breath or spit flying from a dinosaur's mouth (e.g., a mouth of a VR creature 32), feeling spray from the VR/AR nature effects 38 (e.g., a spray/splash from the river 42 and/or puddle 44), and among other suitable fluid effects. In some embodiments, as discussed in detail below, the user may refill the bladder 86 by drawing water from one or more refill stations 20. As discussed above, the refill stations 20 may correspond to VR/AR water images in the VR/AR scenario 30 (e.g., puddle 44 and river 42). As such, the user 22 may navigate to one or more of the puddle 44 and/or river 42 to refill the bladder 86. To refill the bladder 86, the bladder 86 may be coupled to a pump, tube, and any other components necessary for drawing water from a source. In some embodiments, the display module 74 may communicate to the user 22 that they are low on supplies (e.g., water), and direct the user 22 to refill from the one or more refill stations 20 (e.g., the puddle 44 and/or river 42 in the VR/AR scenario 30.). In some embodiments, the user 22 may also navigate to the refill stations 20 to refill one or more VR/AR aspects (e.g., ammunition, air, fuel, etc.) in accordance with a theme of the attraction 10.

The vibration, sound, and air effect systems 79, 82, 84 may provide a unique experience to the user in a similar fashion to the fluid effects system 78. When a user navigates within a predetermined distance of one or more components 80, the vibration effect system 79, the sound effect system 82, the air effect system 84, or any combination thereof may activate. If the user 22 approaches a VR creature 32, the user 22 may fully experience a dinosaur roar. For example, the user 22 may hear the dinosaur roar through speakers of the sound effect system 82, feel a vibration from the dinosaur roar through the vibration effect system 79 and/or through a subwoofer of the sound effect system 82, feel a wind gust from the breath of the dinosaur through fans of the air effects system 84, smell the breath of the dinosaur through a smell additive of the air effects system 84, or any combination thereof. Indeed, it is to be understood that the special effects system 76 is applicable in many ways, and can be applied to fully immerse a user within any entertainment theme (e.g., wizarding, mummies, underwater adventures, superheroes, pirates, etc.).

The braking system 90 of the vehicle may also be utilized in various ways to enhance the experience of the users 22 within the attraction 10. As discussed above, the controllers 52, 56 may process information regarding a location of the users 22 over time. Indeed, one or both of the controllers 52, 56 may calculate current locations of the users 22 as well as future locations of the users 22 based on a velocity (e.g., speed and direction) of the users 22. The controllers 52, 56 may calculate the locations/velocity utilizing information provided by the sensors 59, 61, 57 disposed within the environment 14 and/or on the pod 24. In some embodiments, the controllers 52, 56 may calculate the locations/velocity utilizing information provided by motion-capture cameras disposed within the environment 14 and/or on the pod 24. Accordingly, the controllers 52, 56 may selectively engage brakes 91 of the braking system 90 (e.g., via a drive signal) based at least on the locations of the users. Additionally, or in the alternative, the controller 52, 56 may manipulate the wheels 41 (e.g., via the drive signal) based at least on the locations of the users. For example, in some embodiments the brakes 91 may be engaged to some degree to slow the movement of the users 22 if the users 22 are heading towards a game boundary or object. The degree of engagement may depend on the velocity of the users 22. For example, the brakes 91 may be engaged to hinder movement if the user 22 is swiftly moving towards an object. In some embodiments, the brakes 91 may be engaged to slow movement of the user 22 so that the user 22 does not exceed a predetermined speed. Therefore, all users 22 may not exceed the predetermined speed. In some embodiments, the brakes 91 may be engaged to retard the movement of the user 22 if the user 22 is moving towards an undesirable location (e.g., near a boundary, away from an objective, VR/AR mud, etc.). Particularly, in some embodiments, the brakes 91 may be engaged based on behavior of the user 22. For example, the brakes 91 may be engaged if the user 22 is moving inappropriately, quickly, erratically, etc. The calculated locations of the user(s) 22 relative to one another and environmental objects may be determined to be below a proximity threshold to one another. In such a case, a collision or proximity signal may be generated by the controller 52, 56. If the proximity signal is generated by the attraction controller 56, the proximity signal may be provided to the vehicle controller 52 to cause engagement of the braking system 90. In addition, or in the alternative, the proximity signal may be provided to the vehicle controller 52 to manipulate (e.g., steer) the wheels 41.

As discussed above, movement of the pod 24 (e.g., user-assisted pod, mobile pod) may be at least partially (or completely) powered by a user (e.g., users 22). In some embodiments, movement of the pod 24 may be at least partially powered by a motor 92. In some embodiments, the motor 92 may provide enough power to overcome resistive forces from the pod 24. For example, the pod 24 may be associated with some resistive forces (e.g., moment of inertia, friction, etc.). As such, the motor 92 may provide enough power to overcome the resistive forces so that the user 22 may not feel the effect of the resistive forces of the pod 24. In some embodiments, the amount of power delivered from the motor 92 may be adjusted based on a weight of the user 22. In some embodiments, the amount of power that the motor 92 provides may be adjusted based on the physical capability of the user 22. For example, the motor 92 may provide more power to move the pod 24 if the user 22 is less physically capable. Overall, the motor 92 may provide individualized amounts of power to each pod 24 based on the user's abilities. Therefore, each user 22 may move with the same speed so that more physically capable users 22 do not have an advantage (e.g., speed advantage) over less physically capable users 22. As discussed above, the speed of the user 22 may also be regulated in part by use of the braking system 90. Furthermore, the pod 24 may be powered by any suitable power source 100, including, but not limited to, a battery, a solar panel, an electrical generator, a gas engine, or any combination thereof. In some embodiments, the power source 100 may be located within the vehicle controller 52.

Furthermore, the master controller 58 may control some features of the attraction 10. In addition to the attraction controller 56 discussed above, the master controller 58 may include a distributed control system (DCS) or any computer-based workstation including an input/output interface 102 and a display 104, which in some embodiments, is fully or partially automated. Certain game information may be communicated through the display 104 of the master controller 58. For example, statuses (e.g., locations) of the users 22 may be displayed via the display 104. In some embodiments, a video stream of the environment 14 may be shown on the display 104. In some embodiments, an operator of the master controller 58 may regulate features (e.g., special effects system 76, components 80, etc.) of the attraction 10 from the input/output interface 102. In some embodiments, an operator of the master controller 58 may take control of an individual pod 24. For example, once a game cycle has ended, the operator may control movement of all the pods so that all of the pods are moved to a starting location to begin the game cycle over again with new patrons. In some embodiments, the movement of all the pods 24 to a starting location for the start of a new game cycle may be automated.

Figure 4:
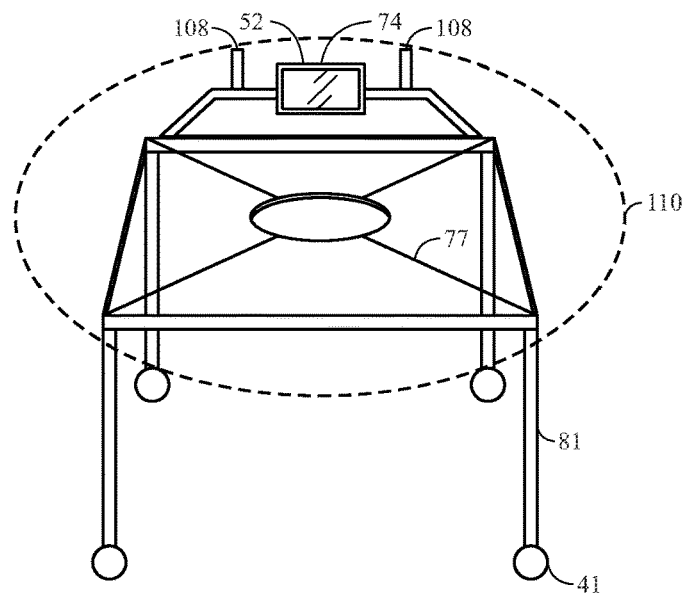
FIG. 4 is an illustration of an embodiment of a VR mobile pod that may be used in conjunction with the game environment of FIG. 1 in accordance with present techniques.

The pod 24 may include features to enhance the experience of a user 22 within the attraction 10. FIG. 4 is an illustration of an embodiment of one of the mobile pods 24 of FIG. 1. In one example, the pod 24 is configured as a fully or partially user-powered vehicle that permits a user to move within the attraction using a relatively natural walking motion. Accordingly, the pod 24 is at least partially moved within the environment by the user's own motive force and, in certain embodiments, is completely user-powered during the course of the attraction. However, it is also contemplated that the pod 24 may also include features that permit automatic movement, e.g., to assist the user, to guide the user away from obstacles, and/or to move an empty pod 24 back to base. To self-power the pod 24, the user walks in a certain direction, and the pod 24 slides along the floor of the environment together with the user, e.g., via one or more wheels 41 on the pod 24. Further, the pod 24 may be sized and shaped to accommodate a single user. In some embodiments, the pod 24 may include a passenger pod coupled to the pod 24, which may accommodate a separate user. The passenger pod may include all features of the pod 24 discussed herein, except the passenger pod may not include controls for steering.

As discussed above, the pod 24 may include the vehicle controller 52, the display module 74, the harness 77, and other features that may be used to enhance the experience of the user 22. The vehicle controller 52 and the display module 74 may be disposed on a front side of the frame 81. Therefore, the user 22 may easily access controls of the display module 74 (e.g., via a touchscreen, buttons, knobs, switches, separate input/output devices etc.). In some embodiments, the user 22 may control aspects of the attraction 10 discussed above via one or more input devices 108. The input devices 108 may be joysticks, buttons, handles, totems, etc. In some embodiments, the input devices 108 may be coupled to the frame 81. In some embodiments, the input devices 108 may be removable from the frame 81 to some degree. The input devices 108 may be tethered to the frame 81 via a wire (e.g., a retractable wire). The input devices 108 may be picked up and waved around to provide a simulated interaction with the VR/AR scenario 30. For example, the user 22 may utilize the input devices 108 to pick up an object (e.g., VR/AR object 36). Therefore, in some embodiments, the input devices 108 may appear as gripping devices (e.g., hands, clamps) to the user 22 within the VR/AR scenario 30. In some embodiments, the input devices 108 may appear as a one or more of several different types of items (e.g., weapons, tools, etc.) in the VR/AR scenario 30.

Further, the pod 24 may be configured to form a boundary 110 about the user 22. The boundary may be circumferentially disposed 0 to 3 feet or 1 to 2 feet radially outward from the perimeter of the frame 81. In some embodiments, the boundary 110 may be defined by the frame 81. The boundary 110 may define an area of space about the user 22 in which the user 22 may be isolated. In some embodiments, the boundary 110 may be defined with a rigid translucent barrier (e.g., plastic) and/or one or more bumpers. Accordingly, the barrier may stop various objects (e.g., other users 22, structures 16, etc.) from coming inside the boundary via the bumpers. Particularly, the bumpers may absorb impact forces when the pod 24 contacts various objects of the environment 14, thereby minimizing a force that the user 22 may experience as a result of contacting the various objects. In some embodiments, the bumpers may be a wear item that may be easily replaceable.

As discussed above, the attraction 10 may utilize various special effects systems 76. One or more of the special effects 76 may be provided from the pod 24. For example, the pod 24 may be fitted with one or more fans for air effects 84, a bladder 86 for the fluid effects 78, one or more speakers for the sounds effect system 82, vibration device(s) of the vibration effects 79, etc.

Also as discussed above, the user 22 (see FIG. 1) may be secured within the harness 77. The harness 77 may be coupled to the frame 81. The frame 81, in conjunction with the harness 77, may provide support to the user 22. Particularly, it should also be noted that the design of the pod 24, in conjunction with the harness 77 and the frame 81, may prevent the pod 24, and the user 22 within the pod 24, from tipping over. In other words, the pod 24 may be designed such that stability may be maintained (e.g., passively and/or actively) regardless of sharp changes in speed/direction, contact with interactive objects 12 and/or another user 22, and so forth. Further, therefore the frame 81 and/or the harness 77 may be adjusted based on a height and/or weight of the user 22. Height of the frame 81 may be adjusted through length adjustment techniques (e.g., telescoping segments, hydraulic powered adjustment, compression/extension springs, linear actuators, etc.). Height of the frame 81 may be locked in place after the start of a cycle of attraction 10. Further, the harness 77 may be adjusted through one or more points of adjustment in accordance with the size and shape of the user 22. In some embodiments, the harness 77 may be coupled to the frame via one or more energy absorption systems (e.g., spring-damper systems, hydraulic systems, etc.). Overall, the harness 77 may allow the users 22 to move (e.g., walk) freely about the environment 14 while supporting the user 22 to prevent falling. The height of the frame 81 and harness 77 may be adjusted so that the harness 77 substantially supports the user 22 about a center of gravity of the user. In some embodiments, the harness 77 may support the users 22 from shoulders and/or waists of the respective users 22.

Figure 5:
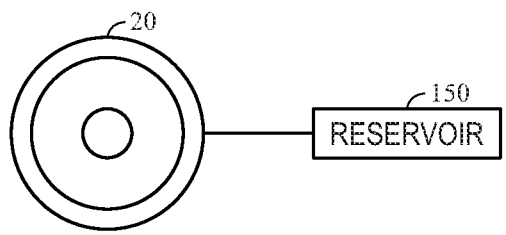
FIG. 5 is block diagram of an effects station within the game environment of FIG. 1 in accordance with present techniques.

FIG. 5 is block diagram of a refill station 20 within the environment 14 of FIG. 1. As discussed above, water may be used in the special effects system 76 via the fluid effects 78. Accordingly, the bladder 86 (e.g., reservoir) that holds the fluid of the fluid effects 78 may be refilled. As discussed above, in order to refill the bladder 86, the bladder 86 may be coupled to a pump, tube, and any other components necessary for drawing fluid from the refill station 20. Indeed, the user 22 may position the pod 24 over one of the refill stations 20. In some embodiments, the user 22 may position a leg of the frame 81 into the refill station 20 to draw fluid from the refill station 20 through tubing disposed on and/or within the frame 81. Thus, tubing disposed on/within the leg may provide for a system to draw fluid via an inlet of the frame 81. Accordingly, the pod 24 (e.g., bladder 86) may draw fluid from the refill station 20, which draws/is provided fluid from a fluid reservoir 150. The reservoir 150 may be disposed beneath a surface of the environment 14. In some embodiments, each refill station 20 may draw fluid from a respective fluid reservoir 150. In some embodiments, multiple refill stations 20 may draw water from a single fluid reservoir 150.

Figure 6:
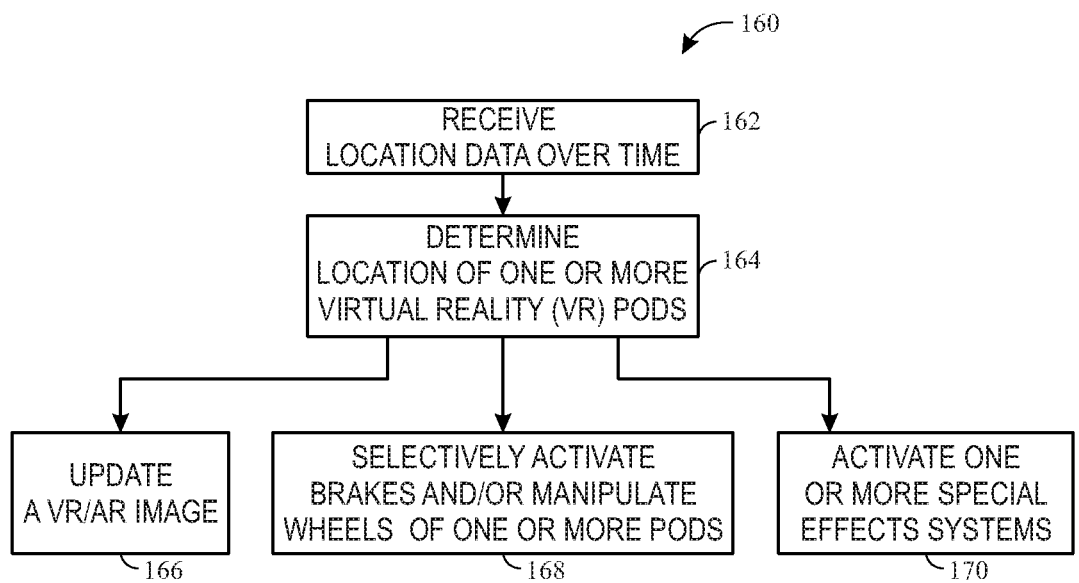
FIG. 6 is a flow diagram of a method of monitoring a position of one or more VR mobile pods within the game environment of FIG. 1 in accordance with present techniques.

FIG. 6 is a flow chart 160 of processing a position of one or more of the pods 24. As discussed above, position of the pods 24 may be determined at least in part via one or more sensors 59, 57, 61 disposed throughout the environment 14 and/or on the pods 24. At block 162, the vehicle controller 52 and/or attraction controller 56 (e.g., controllers 52, 56) may receive information regarding a position of one or more of the pods 24 from the sensors 59, 57, 61. The position information may be transmitted to the controller 52, 56 via a wireless network, e.g., wireless local area networks (WLAN), wireless wide area networks (WWAN), near field communication (NFC). At block 164, the controllers 52, 56 may analyze the location data and determine the location of one or more of the pods 24 and/or users 22.

In some embodiments, at block 166, the controllers 52, 56 may update a VR/AR image based on the determined position of the pods 24. As discussed above, the controllers 52, 56 may provide certain VR/AR images to the users 22 (e.g., via the headgear 26) associated with certain locations of the environment. For example, the controllers 52, 56 may provide images of a component 80 reacting in some way if the user 22 is at a location near the component 80.

In some embodiments, at block 168, the controllers 52, 56 may selectively activate brakes 91 and/or manipulate wheels 41 of one or more of the pods 24 based on the determined position of the pods 24. For example, the brakes 91 and/or wheels 41 may be engaged to control a speed of the user 22, prevent a collision, to help direct the user 22 away from a boundary and/or towards a goal, or any combination thereof.

In some embodiments, at block 170, the controllers 52, 56 may activate one or more special effects systems (e.g., special effects 78, 79, 82, 84, 86) based on the determined position of the pods 24. Specifically, as discussed above, the controllers 52, 56 may activate one or more special effect systems of the pod 24 and/or the environment 14 based on the location of the one or more users 22. For example, one or more special effects associated with a component 80 may be activated if the user is near the component 80.

While only certain embodiments have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A virtual reality attraction system comprising:
    virtual reality and/or augmented reality (VR/AR) headgear configured to display VR/AR images to a user; and
    at least one user-assisted vehicle configured to accommodate the user, the at least one user-assisted vehicle comprising:
        a frame, wherein the frame is configured to permit the user to at least partially provide motor power to move the at least one user-assisted vehicle within the attraction and wherein the frame defines a boundary about the user;
        a harness coupled to the frame and configured to provide support to the user when the user is in the at least one user-assisted vehicle, wherein the frame is configured to permit the motor power provided by the user to move the at least one user-assisted vehicle within the attraction;
        a special effects delivery system configured to deliver one or more special effects to the user, wherein the special effects comprise a vibration effect, an air effect, a fluid effect, a sound effect or any combination thereof; and
        a controller configured to communicate the VR/AR images to the VR/AR headgear and to update the VR/AR images and to activate the special effects delivery system based on a proximity signal indicative of a distance between the at least one user-assisted vehicle and another user-assisted vehicle or an object in the environment.

2. The virtual reality attraction system of claim 1, wherein the controller is disposed on the at least one user-assisted vehicle.

3. The virtual reality attraction system of claim 1, comprising a reservoir disposed in or on the frame and configured to emit a special effects material in response to an activation signal.

4. The virtual reality attraction system of claim 1, wherein an environment of the attraction comprises a plurality of interactive objects comprising one or more special effect refill stations, one or more structures, one or more items, or any combination thereof.

5. The virtual reality attraction system of claim 1, comprising an attraction controller configured to receive one or more signals indicative of one or more locations of the at least one user-assisted vehicle within the attraction from vehicle sensors disposed on the at least one user-assisted vehicle and to provide the proximity signal to the at least one user-assisted vehicle.

6. The virtual reality attraction system of claim 5, wherein the controller is configured to receive the proximity signal and provide a brake signal to a braking system to selectively engage based on the proximity signal.

7. The virtual reality attraction system of claim 5, wherein the controller is configured to receive the proximity signal and provide a drive signal to wheels of the at least one user-assisted vehicle to selectively manipulate the wheels based on the proximity signal.

8. The virtual reality attraction system of claim 1, wherein the controller is configured to control a braking system and wheels of the at least one user-assisted vehicle based on the proximity signal.

9. The virtual reality attraction system of claim 1, wherein the motor power is provided entirely by the user.

10. A virtual reality attraction system comprising:
    a plurality of user-assisted vehicles in an attraction, wherein each respective user-assisted vehicle comprises a vehicle controller;
    an attraction controller configured to provide virtual reality and/or augmented reality (VR/AR) images for an attraction and to communicate the VR/AR images to the plurality of user-assisted vehicles, wherein the attraction controller comprises a processor storing instructions that, when executed, operate to:

receive a first set of position information from each user-assisted vehicle of the plurality of user-assisted vehicles over time;

determine that a first user-assisted vehicle of the plurality of user-assisted vehicles is within a predetermined distance of a second user-assisted vehicle of the plurality of user assisted vehicles; and trigger display of a VR/AR image representative of the first user assisted vehicle to a VR/AR headset associated with the second user-assisted vehicle based on the determination that the first user-assisted vehicle is within the predetermined distance of the second user-assisted vehicle.

11. The virtual reality attraction system of claim 10, wherein the processor stores instructions that, when executed, operate to:

determine that a third user-assisted vehicle is within a second predetermined distance from an artificial attraction object; and trigger display of a VR/AR image indicative of an action associated with the artificial attraction object to a VR/AR headset associated with the third user-assisted vehicle based on the determination that the third user-assisted vehicle is within the second predetermined distance from the artificial attraction object.

12. The virtual reality attraction system of claim 11, wherein the processor stores instructions that, when executed, operate to:

receive a second set of position information from a plurality of motion-capture cameras placed throughout an environment of the attraction; and display a portion of the second set of position information via a display of the attraction controller.

13. The virtual reality attraction system of claim 11, wherein a set of brakes are coupled to each user-assisted vehicle of the plurality of user-assisted vehicles and configured to selectively engage based at least on the determination that the first user-assisted vehicle is within the predetermined distance of the second user-assisted vehicle.

14. The virtual reality attraction system of claim 11, comprising wheels coupled to each user-assisted vehicle of the plurality of user-assisted vehicles and wherein each user-assisted vehicle is configured to selectively steer via selective engagement of the wheels, wherein the selective engagement is based at least on the determination that the first user-assisted vehicle is within the predetermined distance of the second user-assisted vehicle.

15. The virtual reality attraction system of claim 11, wherein a set of brakes are coupled to each user-assisted vehicle of the plurality of user-assisted vehicles and configured to selectively engage based at least on the determination that the third user-assisted vehicle is within the second predetermined distance from the artificial attraction object.

16. The virtual reality attraction system of claim 11, comprising wheels coupled to each user-assisted vehicle of the plurality of user-assisted vehicles and wherein each user-assisted vehicle is configured to selectively steer via selective engagement of the wheels, wherein the selective engagement is based at least on the determination that the third user-assisted vehicle is within the second predetermined distance from the artificial attraction object.

17. The virtual reality attraction system of claim 10, wherein the processor stores instructions that, when executed, operate to:

control a motor and steering system of each user-assisted vehicle of the plurality of user-assisted vehicles.

18. The virtual reality attraction system of claim 10, wherein the processor stores instructions that, when executed, operate to:

control a special effects system configured to deploy one or more special effects based at least on the first set of position information.

19. The virtual reality attraction system of claim 10, wherein a direction of movement of each user-assisted vehicle of the plurality of user-assisted vehicles is configured to be controlled via a first input device of each respective vehicle controller, and wherein each user-assisted vehicle of the plurality of user-assisted vehicles is configured to interact with one or more interactive objects in an environment of the attraction in response to a second input device of each respective vehicle controller.

20. A virtual reality attraction system comprising:

an attraction environment comprising a plurality of attraction structures;

at least one user-assisted vehicle configured to accommodate a user, the at least one user-assisted vehicle comprising:

a frame, wherein the frame is configured to permit the user to at least partially provide motor power to move the at least one user-assisted vehicle within the attraction and wherein the frame defines a boundary about the user;

a harness coupled to the frame and configured to be provide support to the user when the user is in the at least one user-assisted vehicle, wherein the frame is configured to permit the motor power provided by the user to move the at least one user-assisted vehicle within the attraction; and a vehicle controller configured to communicate virtual reality and/or augmented reality (VR/AR) images to VR/AR headgear worn by the user; and an attraction controller comprising a processor configured to execute instructions to cause the attraction controller to:

communicate with the vehicle controller to provide the VR/AR images to the vehicle controller;

receive position information representative of a position of the at least one user-assisted vehicle within the environment; and update the VR/AR images based on the position information; and communicate with the vehicle controller to activate a special effect via the user-assisted vehicle based on the position information.

21. The virtual reality attraction system of claim 20, wherein the vehicle controller receives the positional information over time from one or more sensors disposed on the at least one user-assisted vehicle and/or within the environment.

22. The virtual reality attraction system of claim 20, wherein the at least one user-assisted vehicle comprises handles configured to steer the at least one user-assisted vehicle in response to an input or a force from the user.

23. The virtual reality attraction system of claim 20, wherein the processor is configured to execute instructions to cause the attraction controller to:

determine and track a position of the at least one user-assisted vehicle based on the position information; and communicate with the vehicle controller to emit a special effects material from the at least one user-assisted vehicle based on the position of the at least one user-assisted vehicle.

24. The virtual reality attraction system of claim 23, wherein the processor is configured to execute instructions to cause the attraction controller to:
- emit the special effects material from the at least one user-assisted vehicle based on the position of the at least one user-assisted vehicle relative to a position of an attraction structure of the plurality of attraction structures.

25. The virtual reality attraction system of claim 24, wherein the processor is configured to execute instructions to cause the attraction controller to:
- emit the special effects material from both the frame of the at least one user assisted vehicle and from the attraction structure of the plurality of attraction structures based on the position of the at least one user-assisted vehicle relative to the attraction structure of the plurality of attraction structures.

\* \* \* \* \*